(12) United States Patent
Szczepanik et al.

(10) Patent No.: US 11,269,624 B1
(45) Date of Patent: Mar. 8, 2022

(54) AUTOMATED SOFTWARE APPLICATION BUNDLING

(71) Applicant: INTERNATIONAL BUSINESS MACHINES CORPORATION, Armonk, NY (US)

(72) Inventors: Grzegorz Piotr Szczepanik, Cracow (PL); Piotr Kalandyk, Zielonki (PL); Lukasz Jakub Palus, Cracow (PL); Pawel Tadeusz Januszek, Cracow (PL); Hubert Kompanowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/248,158

(22) Filed: Jan. 12, 2021

(51) Int. Cl.
| | |
|---|---|
| *G06F 8/71* | (2018.01) |
| *G06N 20/00* | (2019.01) |
| *G06F 9/48* | (2006.01) |
| *G06F 8/61* | (2018.01) |

(52) U.S. Cl.
CPC ............... *G06F 8/71* (2013.01); *G06F 8/61* (2013.01); *G06F 9/48* (2013.01); *G06N 20/00* (2019.01)

(58) Field of Classification Search
USPC ......................................................... 717/121
See application file for complete search history.

(56) References Cited

U.S. PATENT DOCUMENTS

| | | | |
|---|---|---|---|
| 8,055,910 B2 * | 11/2011 | Kocher | H04N 21/42646 713/193 |
| 8,839,444 B2 | 9/2014 | Roshchin | |
| 9,389,847 B2 | 7/2016 | Cameron | |
| 9,875,095 B2 | 1/2018 | Hanusiak | |
| 10,169,033 B2 * | 1/2019 | Fabjanski | G06F 8/71 |
| 2009/0158438 A1 * | 6/2009 | Pichetti | G06F 21/10 726/26 |
| 2020/0042317 A1 * | 2/2020 | Zezula | G06F 8/77 |
| 2020/0074048 A1 | 3/2020 | Subramaniam | |

OTHER PUBLICATIONS

Mell, Peter et al.; "The NIST Definition of Cloud Computing;" National Institute of Standards and Technology; Special Publication 800-145; Sep. 2011; 7 pages.

* cited by examiner

*Primary Examiner* — John Q Chavis
(74) *Attorney, Agent, or Firm* — Schmeiser, Olsen & Watts; Christopher M. Pignato

(57) ABSTRACT

A method, system, and computer program product for implementing automated software application bundling is provided. The method includes detecting first software scanners installed within computing devices associated with a hardware device. Licensed software applications and second software scanners installed within a group of computing devices are detected and configuration files associated with initiating execution of the licensed software applications are retrieved from a database. Operational data is retrieved and an associated list describing operational attributes of the computing devices is generated. Likewise, a list of licensed software applications installed within the group of computing devices and a graph presenting communication connections between the computing devices and the hardware device are generated and the licensed software applications are executed with respect to enabling operational functionality for the group of computing devices.

20 Claims, 7 Drawing Sheets

AUTOMATED SOFTWARE APPLICATION BUNDLING

BACKGROUND

The present invention relates generally to a method for automatically bundling software application packages and in particular to a method and associated system for improving software technology associated with scanning hardware devices for licensed software applications and executing the licensed software applications with respect to enabling operational functionality of the hardware devices.

SUMMARY

A first aspect of the invention provides an automated software application bundling method comprising: detecting, by a processor of a server hardware device, first software scanners installed within a plurality of computing devices associated with a hardware device; detecting, by the processor via the first software scanners, licensed software applications installed within a group of computing devices of the plurality of computing devices; detecting, by the processor, second software scanners installed within the group of computing devices; retrieving from a specialized database, by the processor via the second software scanners, configuration files associated with initiating execution of the licensed software applications installed within the group of computing devices; retrieving, by the processor, operational data collected by the first scanners and the second scanners; generating, by the processor based on the operational data, a list describing operational attributes of the plurality of computing devices; generating, by the processor based on the operational data, a list of licensed software applications installed within the group of computing devices; generating, by the processor based on the operational data, a graph presenting communication connections between the plurality of computing devices and the hardware device; and executing, by the processor based on analysis of the list describing operational attributes, the list of licensed software applications, and the graph, the licensed software applications with respect to enabling operational functionality for the group of computing devices.

A second aspect of the invention provides a computer program product, comprising a computer readable hardware storage device storing a computer readable program code, the computer readable program code comprising an algorithm that when executed by a processor of a server hardware device implements an automated software application bundling method, the method comprising: detecting, by the processor, first software scanners installed within a plurality of computing devices associated with a hardware device; detecting, by the processor via the first software scanners, licensed software applications installed within a group of computing devices of the plurality of computing devices; detecting, by the processor, second software scanners installed within the group of computing devices; retrieving from a specialized database, by the processor via the second software scanners, configuration files associated with initiating execution of the licensed software applications installed within the group of computing devices; retrieving, by the processor, operational data collected by the first scanners and the second scanners; generating, by the processor based on the operational data, a list describing operational attributes of the plurality of computing devices; generating, by the processor based on the operational data, a list of licensed software applications installed within the group of computing devices; generating, by the processor based on the operational data, a graph presenting communication connections between the plurality of computing devices and the hardware device; and executing, by the processor based on analysis of the list describing operational attributes, the list of licensed software applications, and the graph, the licensed software applications with respect to enabling operational functionality for the group of computing devices.

A third aspect of the invention provides a server hardware device comprising a processor coupled to a computer-readable memory unit, the memory unit comprising instructions that when executed by the processor implements an automated software application bundling method comprising: detecting, by the processor, first software scanners installed within a plurality of computing devices associated with a hardware device; detecting, by the processor via the first software scanners, licensed software applications installed within a group of computing devices of the plurality of computing devices; detecting, by the processor, second software scanners installed within the group of computing devices; retrieving from a specialized database, by the processor via the second software scanners, configuration files associated with initiating execution of the licensed software applications installed within the group of computing devices; retrieving, by the processor, operational data collected by the first scanners and the second scanners; generating, by the processor based on the operational data, a list describing operational attributes of the plurality of computing devices; generating, by the processor based on the operational data, a list of licensed software applications installed within the group of computing devices; generating, by the processor based on the operational data, a graph presenting communication connections between the plurality of computing devices and the hardware device; and executing, by the processor based on analysis of the list describing operational attributes, the list of licensed software applications, and the graph, the licensed software applications with respect to enabling operational functionality for the group of computing devices.

The present invention advantageously provides a simple method and associated system capable of automatically bundling software application packages.

DETAILED DESCRIPTION

Figure 1:
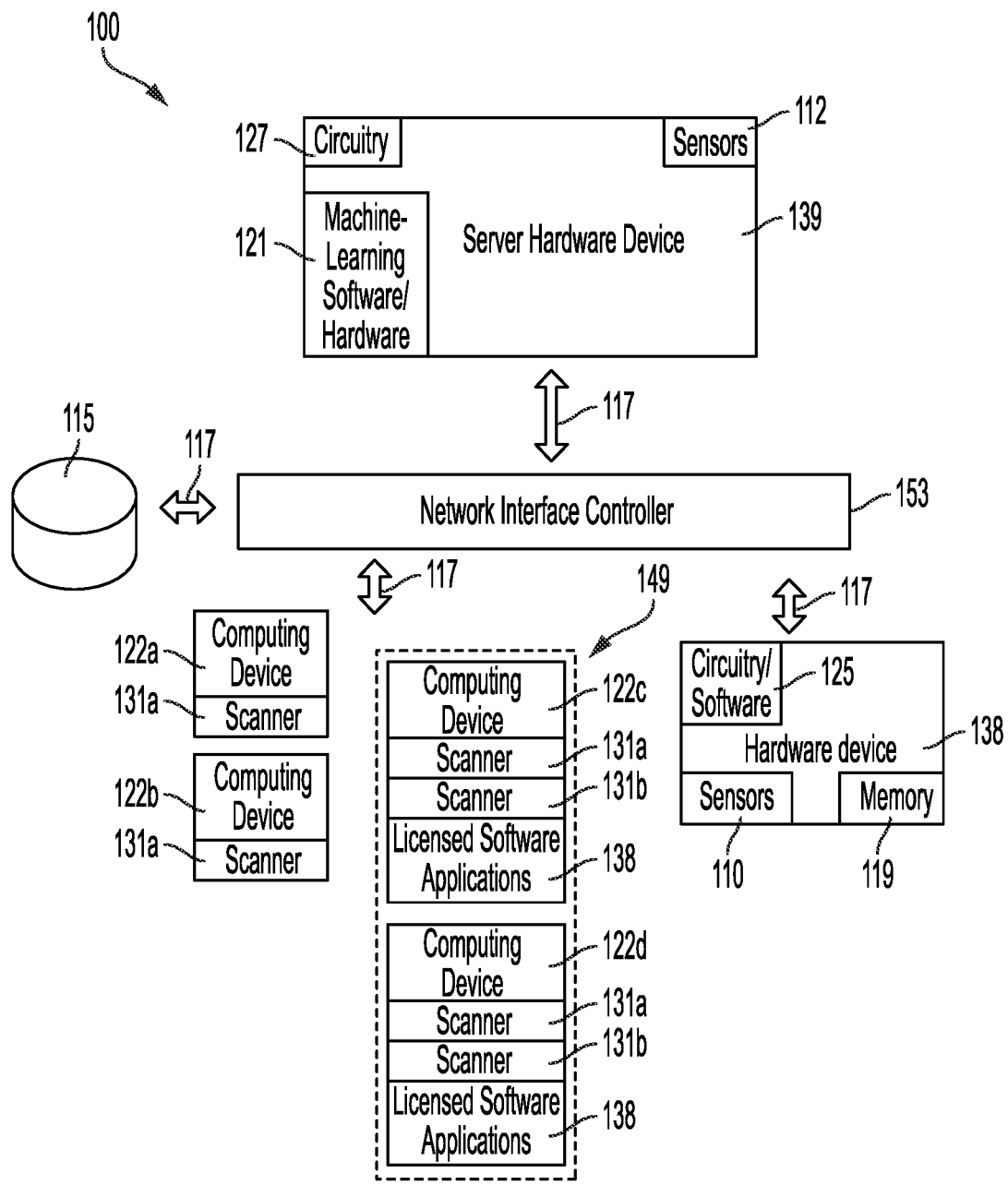
FIG. 1 illustrates a system for improving software technology associated with scanning hardware devices for licensed software applications and executing the licensed software applications with respect to enabling operational functionality of the hardware devices, in accordance with embodiments of the present invention.

FIG. 1 illustrates a system 100 for improving software technology associated with scanning hardware devices for licensed software applications and executing the licensed software applications with respect to enabling operational functionality of the hardware devices, in accordance with embodiments of the present invention. Typical appliance operational solutions provide licensed software applications as a part of a hardware/software package. For example, an analytics appliance may include licensed entitlement software that requires installation within a separate server/workstation. The licensed entitlement software requires tracking and monitoring. The licensed entitlement software being included within the hardware/software package may not allow for a standard reimbursement policy to be implemented. Therefore, an improved process for tracking software for ease of reporting instances attached to specified appliances may be preferable within large hardware/software environments. The large hardware/software environments may comprise hundreds of devices/appliances being continuously added/removed/restarted and an associated tracking process with respect to detecting proper software entitlements may comprise a labor intensive process. Therefore, system 100 enables an automated process for providing current and precise information associated with operational usage of software licenses installed within separate servers/workstations and appliances that are associated with hardware devices.

System 100 enables a process for automatic bundling software products with a hardware appliance by providing precise and current information associated with usage of software licenses installed within separate workstations/servers and appliances that are associated with specified machines.

System 100 of FIG. 1 includes a server hardware device 139 (i.e., specialized hardware), computing (hardware) hardware devices 122a . . . 122d, a hardware device 138, a database 115, and a network interface controller 153 interconnected through a network 117. Server hardware device 139 includes specialized circuitry 127 (that may include specialized software), sensors 112, and machine learning software code/hardware structure 121 (i.e., including machine learning software code). Network interface controller 153 may include any type of device or apparatus for securely interfacing hardware and software to a network. Hardware device 138 comprises any type of hardware or software device associated with operation with respect to computing devices 122a . . . 122d. Hardware device 138 includes specialized circuitry 125 (that may include specialized software), memory 119 (for storing licensed software), and sensors 110. Sensors 110 and 112 may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Computing devices 122a and 122b each include a software scanner 131a for retrieving operational data and detecting licensed software applications located within additional computing devices. Computing devices 122c and 122d each include software scanner 131a for and 131b for detecting licensed software applications 138 located internally within computing devices 122c and 122d. Computing devices 122c and 122d are assigned to a group 149 specifying inclusion of licensed software applications 138. Server hardware device 139, computing devices 122a . . . 122d, and hardware device 138 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 139, computing devices 122a . . . 122d, and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with scanning hardware devices for licensed software applications and executing the licensed software applications with respect to enabling operational functionality of the hardware devices. Network 117 may include any type of network including, inter alia, a 5G telecom network, a local area network, (LAN), a wide area network (WAN), the Internet, a wireless network, etc. Alternatively, network 117 may include an application programming interface (API).

Scanners 131a are installed within all of computing devices 122a-122d. Scanners 131a are configured to discover installed licensed software applications 138. Likewise, scanners 131a are configured retrieve operational and capacity data from computing devices 122a-122d and hardware device 138.

Scanners 131b are installed within computing devices 122c-122d (e.g., via a fixlet) that include licensed software applications 138 being provided as a part of a package with hardware appliances. Scanners 131b are configured to communicate with a specialized knowledge database 115 for enabling a process for searching for configuration files associated with licensed software applications 138. The configuration files may include connection details (e.g., IP addresses/ports) for connecting to hardware device 138. For example, a connection file may be provided as follows:

<dataSource id="Connection"
jandiName="jdbc/applianceConnection">
<properties.db2.jcc databaseName="APP_DB" driverType="4"
Password="example" portNumber="9999"
serverName="bigdata.example.com" user="name"/>
</dataSource>

Server hardware device 139 is configured to retrieve data collected via scanners 131a and 131bb with respect to a list of hardware devices (e.g., hardware device 138) under operation. The collected data and associated records (of the list of hardware devices) are compared and matched (based on similarities) and a report is generated. The report comprises a full list of appliances, software instances being enabled within computers, and a graph presenting connections between workstations/servers and appliances. Computer and appliance usage data may be retrieved and analyzed for detecting underutilized licensed software applications. installations.

Figure 2:
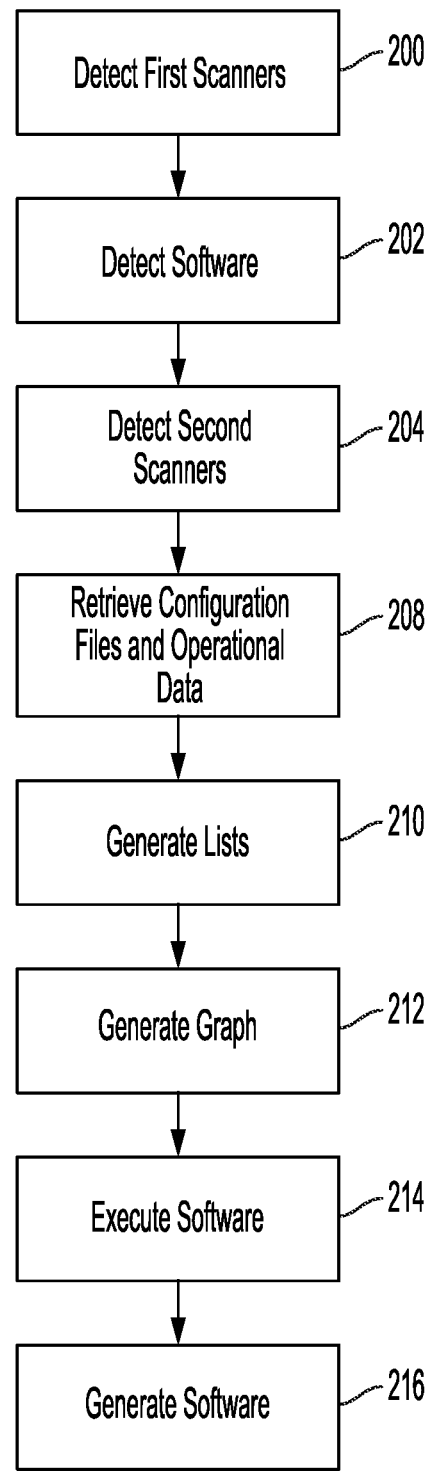
FIG. 2 illustrates an algorithm detailing a process flow enabled by the system of FIG. 1 for improving software technology associated with scanning hardware devices for licensed software applications and executing the licensed software applications with respect to enabling operational functionality of the hardware devices, in accordance with embodiments of the present invention.

FIG. 2 illustrates an algorithm detailing a process flow enabled by system 100 of FIG. 1 for improving software technology associated with scanning hardware devices for licensed software applications and executing the licensed software applications with respect to enabling operational functionality of the hardware devices, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 139, computing devices 122a . . . 122d, and hardware device 138. In step 200, first software scanners are detected. The first software scanners are installed within computing devices associated with a hardware device. In step 202, licensed software applications installed within a group of computing devices are detected via the first software scanners. The licensed software applications may be installed as a package with the hardware device. Additionally, usage attributes associated with operational usage of the licensed software applications may be detected and (based on analysis of the usage attributes) underutilized installations associated with at least one licensed software application may be determined with respect to the hardware device.

In step 204, second software scanners installed within the group of computing devices are detected. In step 208, configuration files are retrieving from a specialized database via the second software scanners. The configuration files are associated with initiating execution of the licensed software applications installed within the group of computing devices. Additionally, operational data is collected by the first and second scanners. The configuration files include connection data for connecting the computing devices to the hardware device. The connection data may include, inter alia, IP addresses, port data, a username, a protocol type, a database driver type, a hostname associated with the computing devices and hardware device, etc.

In step 210, a list describing operational attributes of the computing devices is generated based on the operational data. Additionally, a list of licensed software applications installed within the computing devices is generated based on the operational data. In step 212, a graph is generated based on the operational data. The graph is configured to present communication connections between the computing devices and the hardware device. In step 214, the licensed software applications are executed with respect to enabling operational functionality for the group of computing devices. The licensed software applications are executed based on analysis of the lists generated in step 210 and the graph generated in step 212. Executing the licensed software applications may be performed based on analysis of capacity data (retrieved via the first software scanners) defining a hardware, software, and memory capacity of the computing devices.

In step 216, self-learning software code configured to execute future instances of automated software application bundling is generated.

Figure 3:
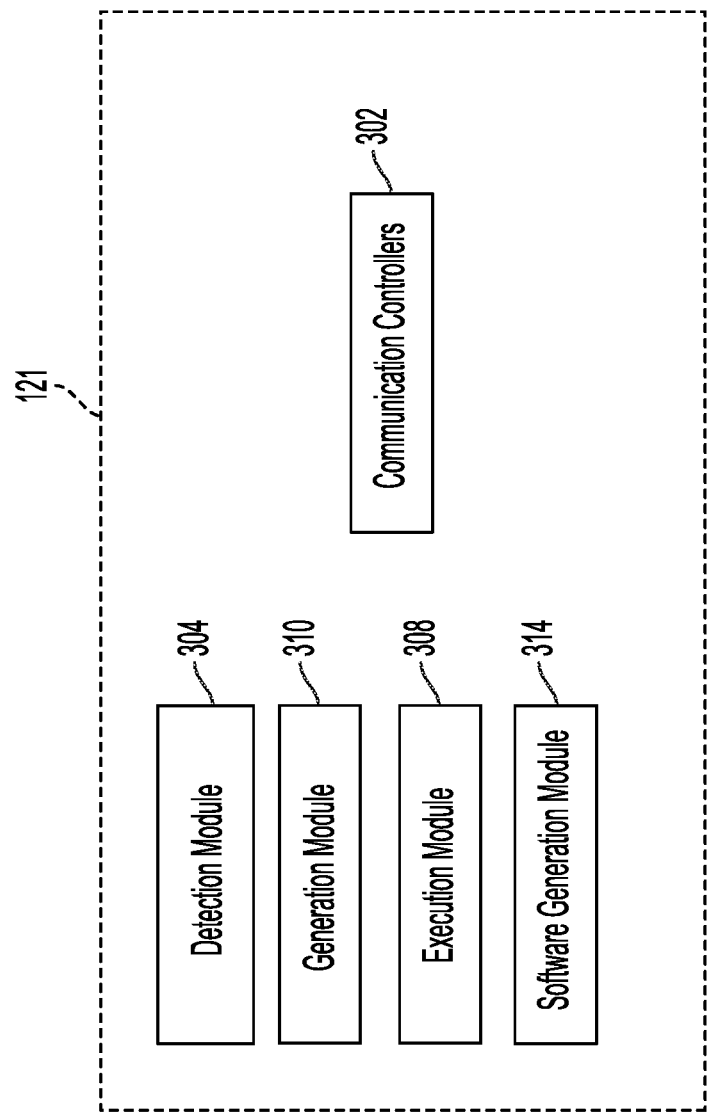
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121 (and/or circuitry 127) of FIG. 1, in accordance with embodiments of the present invention. Machine learning software/hardware structure 121 includes detection module 304, a generation module 310, an execution module 308, a software generation module 314, and communication controllers 302. Detection module 304 comprises specialized hardware and software for controlling all functions related to the detection steps of FIGS. 1 and 2. Generating module 310 comprises specialized hardware and software for controlling all functionality related to the generating steps for generating the lists and graph of the algorithm of FIG. 2. Execution module 308 comprises specialized hardware and software for controlling all functions related to the software execution steps of FIG. 2. Software generation 314 comprises specialized hardware and software for controlling all functions related to generating software as described with respect to the algorithm of FIG. 2. Communication controllers 302 are enabled for controlling all communications between detection module 304, generation module 310, execution module 308, and software generation module 314.

Figure 4:
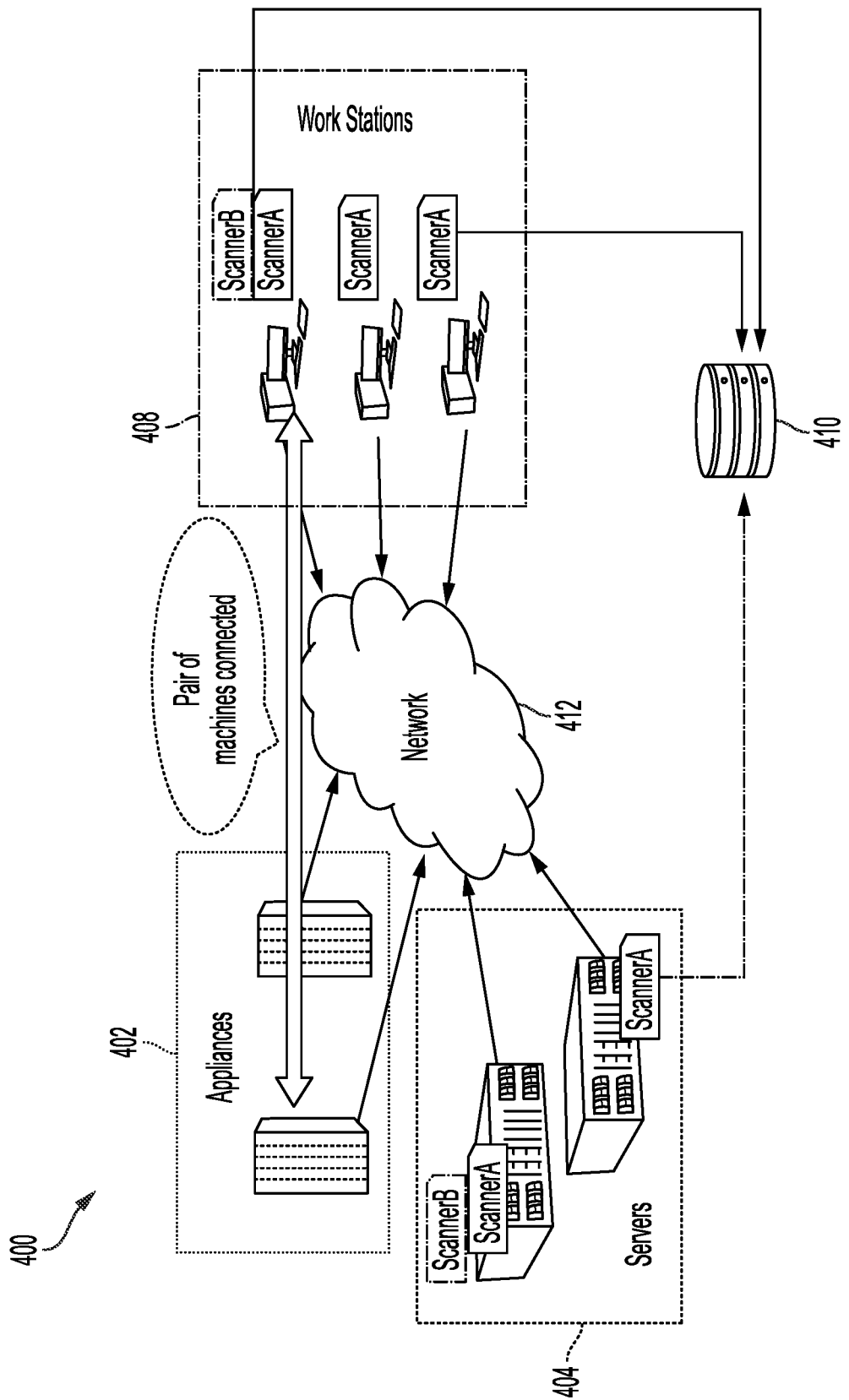
FIG. 4 illustrates a computing environment for implementing the algorithm of FIG. 2, in accordance with embodiments of the present invention.

FIG. 4 illustrates a computing environment 400 for implementing the algorithm of FIG. 2, in accordance with embodiments of the present invention. Computing environment 400 comprises appliances 402, servers 404, workstations 408, and a database 410 interconnected via a network 412. Workstations 408 and Servers 404 each include installed software scanners types A and B. Each of workstations 408 may be defined as a computer/hardware including installed licensed software applications and a graphical user interface (GUI) configured for usage by a single user. Each of servers 404 may be defined as a computer/hardware including installed licensed software configured for usage by multiple users and providing services via WebUI/CLI. Workstations 408 and servers 404 may be implemented as concrete hardware machines or a virtualized system. Software scanner types A are present on every workstation and server within computing environment 400. Software scanner types B are installed on select workstations and servers running software connecting to appliances 402 and licensed as a part of an appliance bundle. An appliance is defined herein as a computing system combining hardware, software, and specific sets of ready to use data not being directly used by a user (i.e., a user is unable to install software on an appliance). The appliance is implemented via providing services to workstations 408 and servers 404 via network 412.

Figure 5:
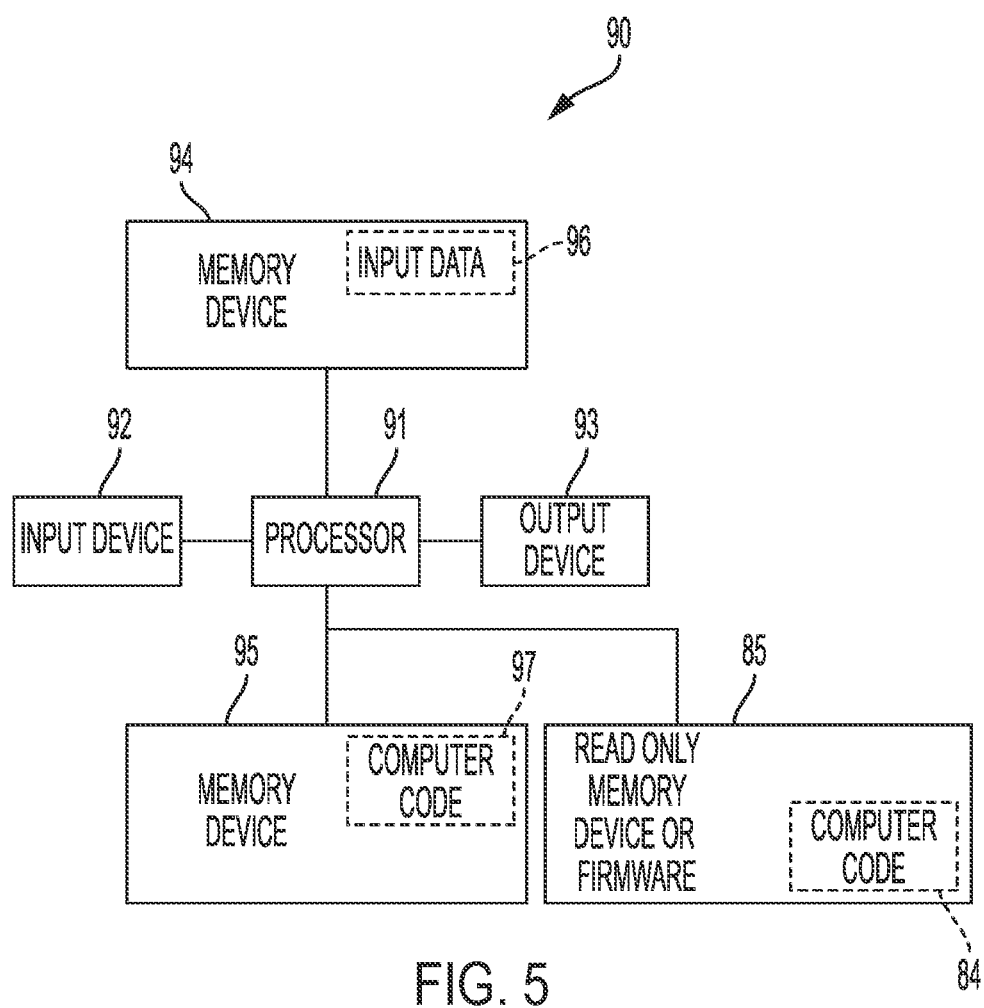
FIG. 5 illustrates a computer system used by the system of FIG. 1 for improving software technology associated with scanning hardware devices for licensed software applications and executing the licensed software applications with respect to enabling operational functionality of the hardware devices, in accordance with embodiments of the present invention.

FIG. 5 illustrates a computer system 90 (e.g., server hardware device 139, computing devices 122a . . . 122d, and/or hardware device 139 of FIG. 1) used by or comprised by the system of FIG. 1 for improving software technology associated with scanning hardware devices for licensed software applications and executing the licensed software applications with respect to enabling operational functionality of the hardware devices, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software technology associated with scanning hardware devices for licensed software applications and executing the licensed software applications with respect to enabling operational functionality of the hardware devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with scanning hardware devices for licensed software applications and executing the licensed software applications with respect to enabling operational functionality of the hardware devices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with scanning hardware devices for licensed software applications and executing the licensed software applications with respect to enabling operational functionality of the hardware devices. In another embodiment, the invention provides a business method that performs the process steps of the invention on a subscription, advertising, and/or fee basis. That is, a service supplier, such as a Solution Integrator, could offer to enable a process for improving software technology associated with scanning hardware devices for licensed software applications and executing the licensed software applications with respect to enabling operational functionality of the hardware devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
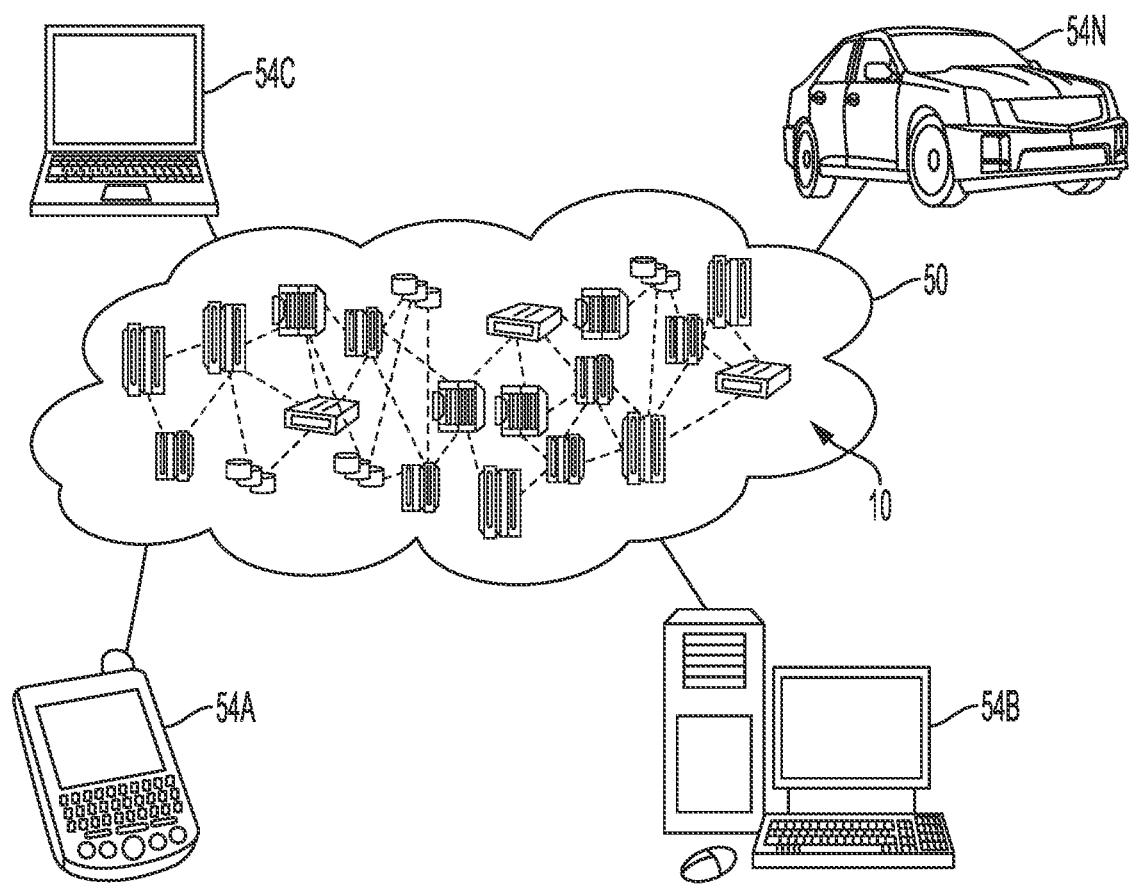
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
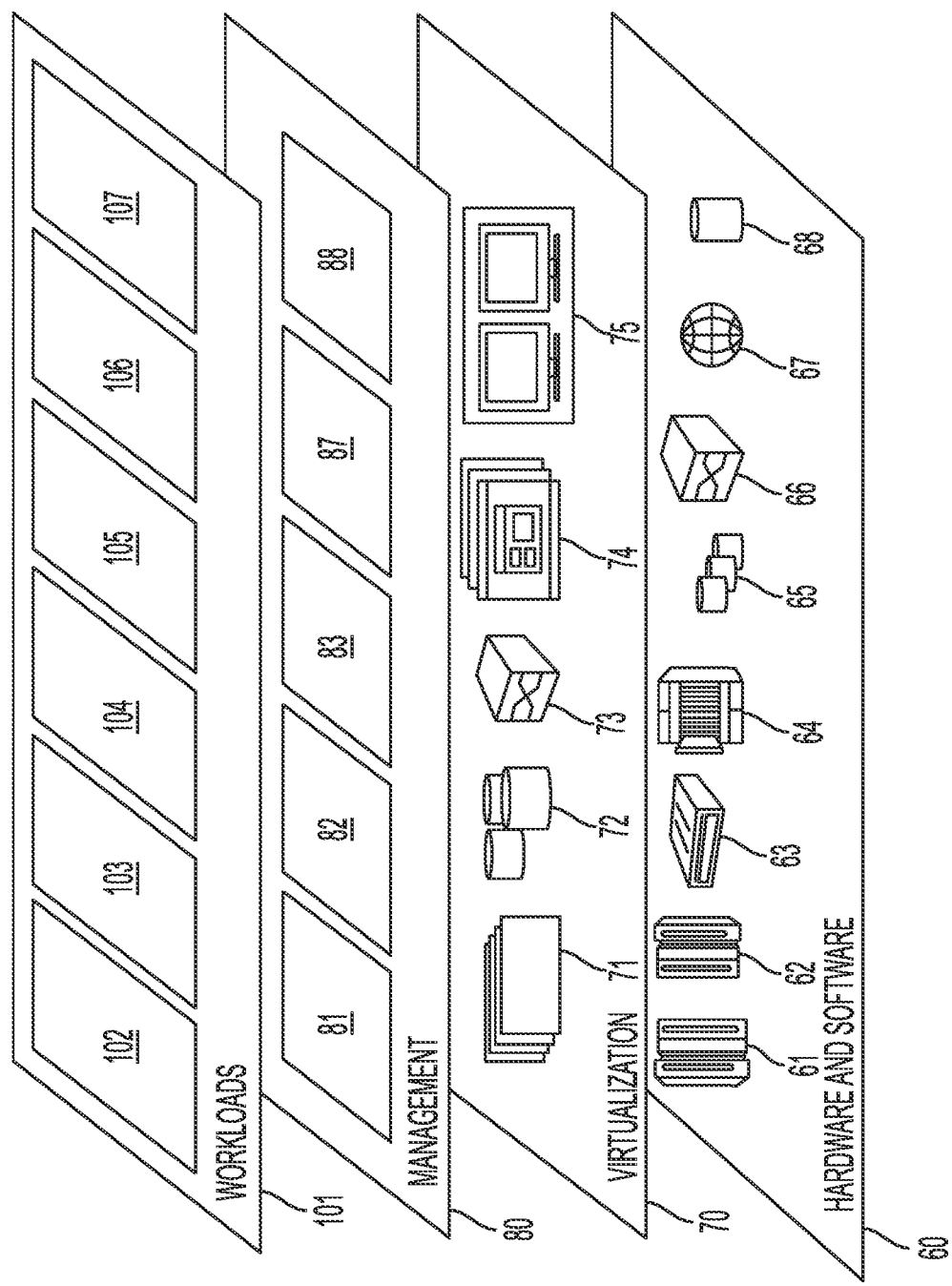
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software technology associated with scanning hardware devices for licensed software applications and executing the licensed software applications with respect to enabling operational functionality of the hardware devices 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated software application bundling method comprising:

detecting, by a processor of a server hardware device, first software scanners installed within a plurality of computing devices associated with a hardware device;

detecting, by said processor via said first software scanners, licensed software applications installed within a group of computing devices of said plurality of computing devices;

detecting, by said processor, second software scanners installed within said group of computing devices;

retrieving from a specialized database, by said processor via said second software scanners, configuration files associated with initiating execution of said licensed software applications installed within said group of computing devices;

retrieving, by said processor, operational data collected by said first scanners and said second scanners;

generating, by said processor based on said operational data, a list describing operational attributes of said plurality of computing devices;

generating, by said processor based on said operational data, a list of licensed software applications installed within said group of computing devices;

generating, by said processor based on said operational data, a graph presenting communication connections between said plurality of computing devices and said hardware device; and executing, by said processor based on analysis of said list describing operational attributes, said list of licensed software applications, and said graph, said licensed software applications with respect to enabling operational functionality for said group of computing devices.

2. The method of claim 1, wherein said configuration files comprise connection data for connecting said plurality of computing devices to said hardware device.

3. The method of claim 1, wherein said connection data comprises data selected from the group consisting of IP addresses, port data, a username, a protocol type, a database driver type, a hostname associated with said plurality of computing devices and said hardware device.

4. The method of claim 1, further comprising:
retrieving, by said processor via said first software scanners, capacity data defining a hardware, software, and memory capacity of said plurality of computing devices, wherein said executing said licensed software applications is performed based on analysis of said capacity data.

5. The method of claim 1, wherein said licensed software applications are installed as a package with said hardware device.

6. The method of claim 5, further comprising:
detecting, by said processor, usage attributes associated with operational usage of said licensed software applications; and
determining, by said processor based on analysis of said usage attributes, underutilized installations associated with at least one licensed software application of said licensed software applications with respect to said hardware device.

7. The method of claim 1, further comprising:
generating, by said processor, self-learning software code configured to execute future instances of said automated software application bundling.

8. The method of claim 1, further comprising:
providing at least one support service for at least one of creating, integrating, hosting, maintaining, and deploying computer-readable code in the server hardware device, said code being executed by the computer processor to implement: said detecting said first software scanners, said detecting said licensed software applications, said detecting said second software scanners, said retrieving said configuration files, said retrieving said operational data, said generating said list describing said operational attributes, said generating said list of said licensed software applications, said generating said graph, and said executing.

9. A computer program product, comprising a computer readable hardware storage device storing a computer readable program code, said computer readable program code comprising an algorithm that when executed by a processor of a server hardware device implements an automated software application bundling method, said method comprising:

detecting, by said processor, first software scanners installed within a plurality of computing devices associated with a hardware device;

detecting, by said processor via said first software scanners, licensed software applications installed within a group of computing devices of said plurality of computing devices;

detecting, by said processor, second software scanners installed within said group of computing devices;

retrieving from a specialized database, by said processor via said second software scanners, configuration files associated with initiating execution of said licensed software applications installed within said group of computing devices;

retrieving, by said processor, operational data collected by said first scanners and said second scanners;

generating, by said processor based on said operational data, a list describing operational attributes of said plurality of computing devices;

generating, by said processor based on said operational data, a list of licensed software applications installed within said group of computing devices;

generating, by said processor based on said operational data, a graph presenting communication connections between said plurality of computing devices and said hardware device; and executing, by said processor based on analysis of said list describing operational attributes, said list of licensed software applications, and said graph, said licensed software applications with respect to enabling operational functionality for said group of computing devices.

10. The computer program product of claim 9, wherein said configuration files comprise connection data for connecting said plurality of computing devices to said hardware device.

11. The computer program product of claim 9, wherein said connection data comprises data selected from the group consisting of IP addresses, port data, a username, a protocol type, a database driver type, a hostname associated with said plurality of computing devices and said hardware device.

12. The computer program product of claim 9, wherein said method further comprises:
retrieving, by said processor via said first software scanners, capacity data defining a hardware, software, and memory capacity of said plurality of computing devices, wherein said executing said licensed software applications is performed based on analysis of said capacity data.

13. The computer program product of claim 9, wherein said licensed software applications are installed as a package with said hardware device.

14. The computer program product of claim 13, wherein said method further comprises:
detecting, by said processor, usage attributes associated with operational usage of said licensed software applications; and determining, by said processor based on analysis of said usage attributes, underutilized installations associated with at least one licensed software application of said licensed software applications with respect to said hardware device.

15. The computer program product of claim 9, wherein said method further comprises:

generating, by said processor, self-learning software code configured to execute future instances of said automated software application bundling.

16. A server hardware device comprising a processor coupled to a computer-readable memory unit, said memory unit comprising instructions that when executed by the processor implements an automated software application bundling method comprising:

detecting, by said processor, first software scanners installed within a plurality of computing devices associated with a hardware device;

detecting, by said processor via said first software scanners, licensed software applications installed within a group of computing devices of said plurality of computing devices;

detecting, by said processor, second software scanners installed within said group of computing devices;

retrieving from a specialized database, by said processor via said second software scanners, configuration files associated with initiating execution of said licensed software applications installed within said group of computing devices;

retrieving, by said processor, operational data collected by said first scanners and said second scanners;

generating, by said processor based on said operational data, a list describing operational attributes of said plurality of computing devices;

generating, by said processor based on said operational data, a list of licensed software applications installed within said group of computing devices;

generating, by said processor based on said operational data, a graph presenting communication connections between said plurality of computing devices and said hardware device; and executing, by said processor based on analysis of said list describing operational attributes, said list of licensed software applications, and said graph, said licensed software applications with respect to enabling operational functionality for said group of computing devices.

17. The server hardware device of claim 16, wherein said configuration files comprise connection data for connecting said plurality of computing devices to said hardware device.

18. The server hardware device of claim 16, wherein said connection data comprises data selected from the group consisting of IP addresses, port data, a username, a protocol type, a database driver type, a hostname associated with said plurality of computing devices and said hardware device.

19. The server hardware device of claim 16, wherein said method further comprises:

retrieving, by said processor via said first software scanners, capacity data defining a hardware, software, and memory capacity of said plurality of computing devices, wherein said executing said licensed software applications is performed based on analysis of said capacity data.

20. The server hardware device of claim 16, wherein said licensed software applications are installed as a package with said hardware device.

* * * * *